3,002,103
CONTROL CIRCUIT FOR THE STARTER MOTOR OF AN AUTOMOBILE VEHICLE

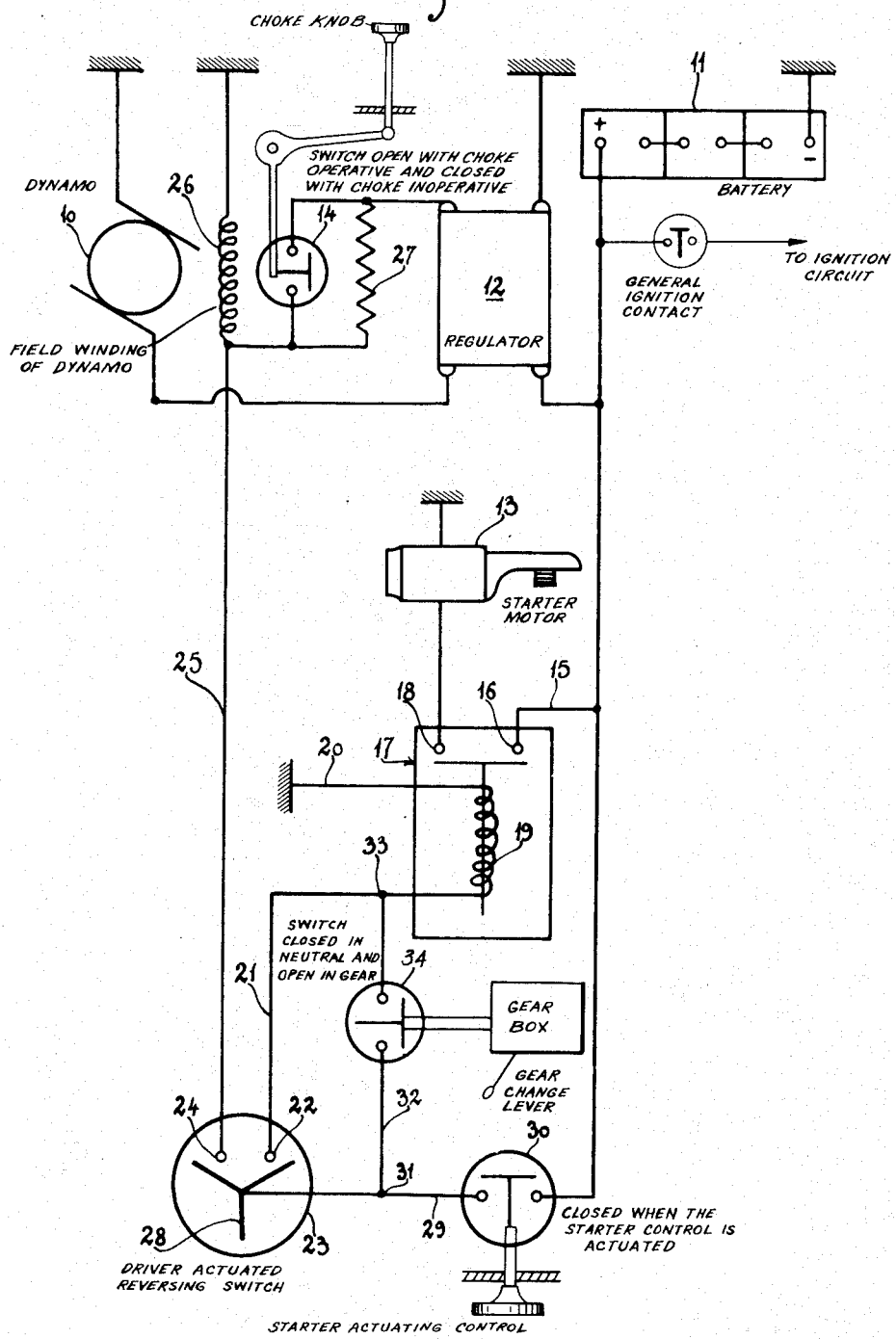

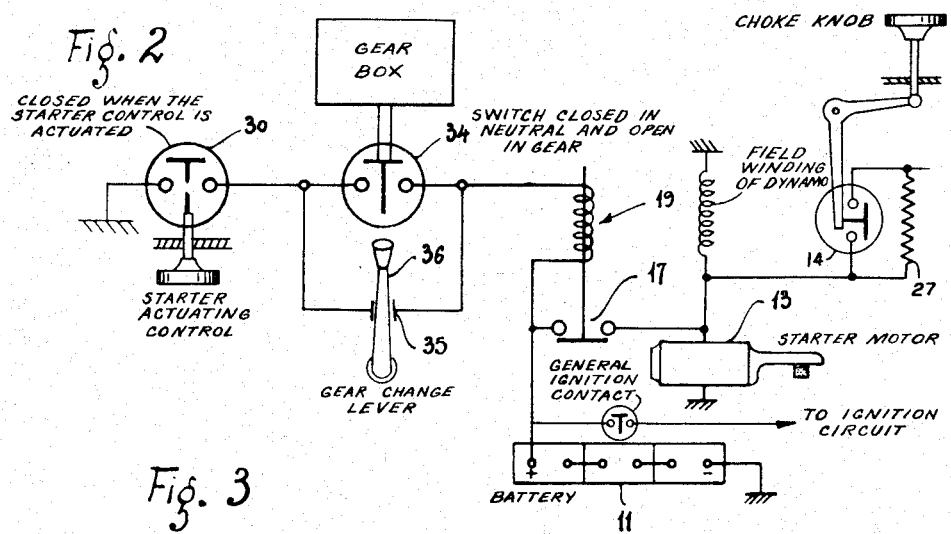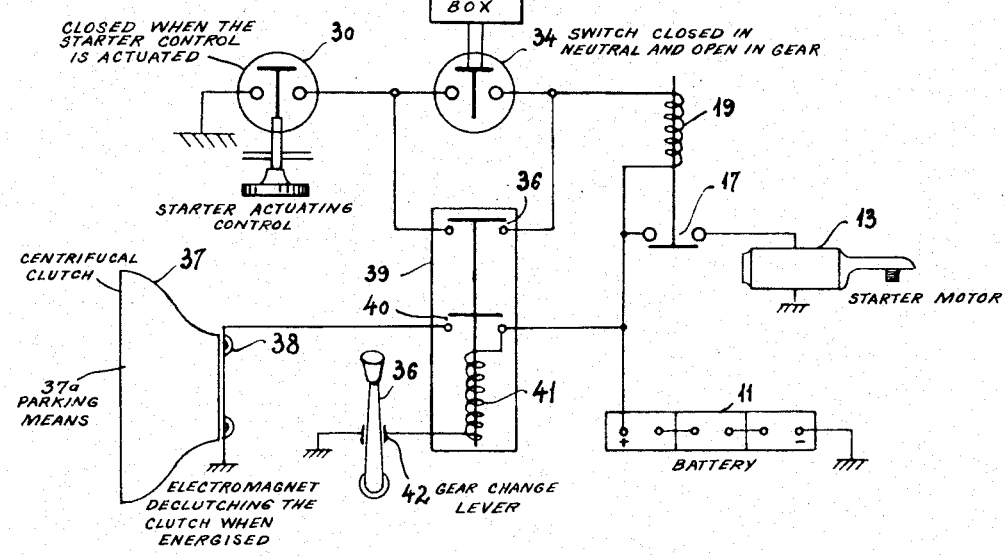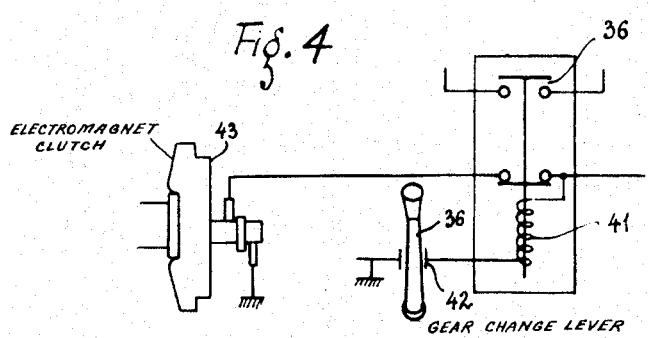

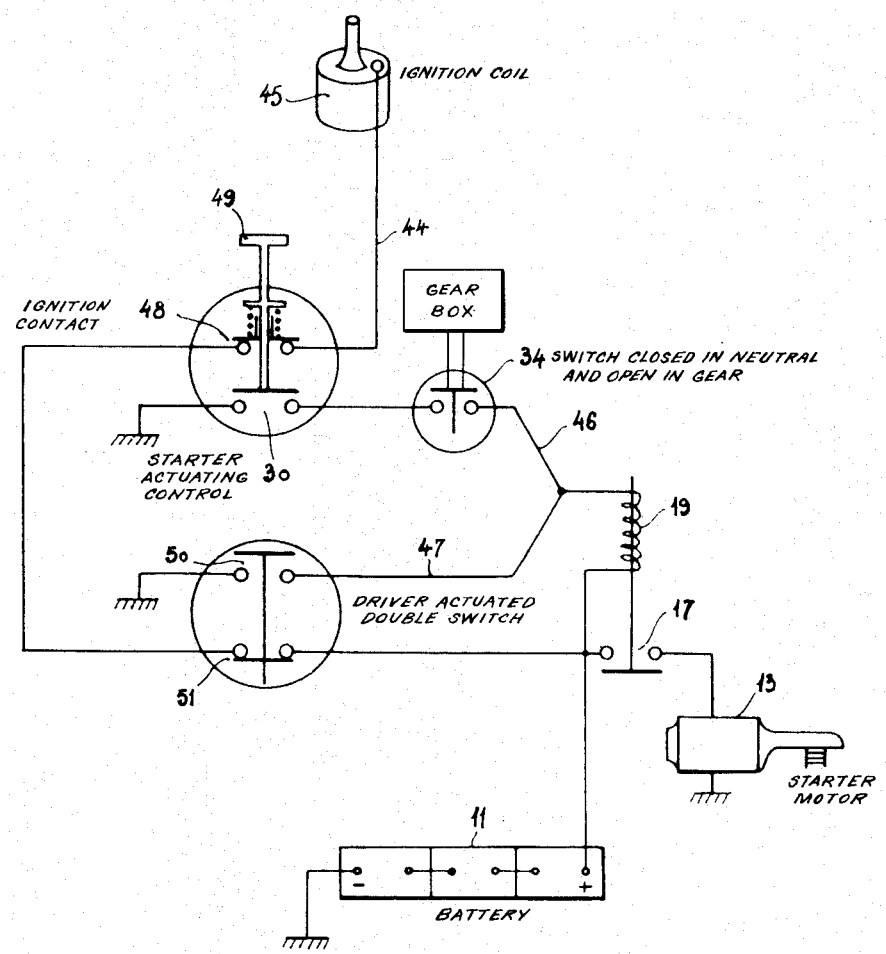

Jean Maurice and Michel Rist, Paris, France, assignors to Societe Anonyme Francaise du Ferodo, Paris, France, a corporation of France
Filed Dec. 17, 1957, Ser. No. 703,328
Claims priority, application France Nov. 17, 1953
5 Claims. (Cl. 290—36)

The present invention is a continuation-in-part of our co-pending application No. 469,261, filed on November 16, 1954, and relates more particularly to a control circuit for the starter motor of an automobile vehicle having an automatic clutch.

An object of the present invention is to normally preclude starting operation of the starter motor when the gear-box is in gear.

Another object of the present invention is to enable restoring the gear-box to neutral for actuating the starter motor when a parking device is provided on the vehicle and this latter has been stopped on a slope.

Further objects, features and advantages of the invention will be brought out in the description which follows below of forms of embodiments of the invention chosen by way of example with reference to the attached drawings, in which:

FIG. 1 is an electric diagram of the control circuit of the starter motor.

FIG. 2 is a diagram of a modification of this control circuit.

FIGS. 3 and 4 are diagrams of the circuit of FIG. 2 as applied to two different types of automatic clutches for the vehicle respectively.

FIG. 5 is a diagram of a further modification of the control circuit.

Reference will first be made to FIG. 1. There is seen at 10 the dynamo of the vehicle driven from the crankshaft of the engine and at 11 the accumulator battery. The dynamo 10 and the battery 11 are those which form the equipment of a normal automobile vehicle and carry out all their usual functions with the ordinary connections, in particular with a make-and-break switch and/or a voltage regulator 12. There will be seen at 13 the starter motor and at 14 a switch operated by the air-choke mixture control.

The battery 11 is connected by a conductor 15 to one terminal 16 of a closure relay 17 of the starter motor 13. The other terminal 18 of the relay 17 is connected to ground by a conductor in which is mounted the starter 13.

The coil 19 of the relay 17 of the starter has one of its ends connected to ground through a conductor 20 while the other end of the coil 19 is connected by a conductor 21 to a terminal 22 of a reversing switch 23. The other terminal 24 of the reversing switch 23 is connected by a conductor 25 to a first extremity of the field winding 26 of the dynamo 10, the other extremity of which is connected to ground. The first extremity of the field winding 26 is also connected to one terminal of the make-and-break switch and regulator 12 through a resistance 27 which can be shunted by the switch 14 operated in dependence on the position of the control knob of the choke. The switch 14 is open when the choke is made operative and is closed when the choke is made inoperative. The resistance 27 is calculated in such a way as to re-produce during idle running accelerated with the choke, an electro-motive force from the dynamo, greater than that developed at normally idle running without choke but still sufficiently low to prevent the vehicle, when cold and with no load, from being driven on the level. It is to be noted that the electro-motive force under accelerated idle running conditions may reach from three to eight times that generated at normal idle running. The resistance 27 may thus be very small, for example of the order of the resistance of the field winding 26 itself. It is not likely to set back in any inadmissible manner the normal speed of switching-in nor to give rise to premature cutting-out of the dynamo. The three other terminals of the regulator 12 are respectively connected to ground, to the battery 11 and to the dynamo 10.

The double moving finger 28 of the reversing switch 23 is connected to the battery 11 by a conductor 29 comprising a switch 30 for the control of the starter motor 13. A point 31 on the conductor 29 comprised between the reversing switch 23 and the switch 30 is connected by a conductor 32 to a point 33 on the conductor 21 comprised between the coil 19 and the terminal 22. The conductor 32 includes a safety switch 34 controlled in dependence on the position of the gear-box in such manner that the switch 34 is open when a gear is engaged and closed when the gear-box is in neutral.

With a view to starting-up under normal conditions of operation which do not require the use of the choke 14, the general ignition contact is closed. The gear lever is in neutral so that the safety switch 34 is closed. The reversing switch 23 has its finger 28 connected by the driver to the terminal 24. When the switch 30 of the starter is closed, the battery 11 supplies current to the coil 19 and this connects the terminals 16, 18 of the relay 17 so that the starter motor 13 is supplied with current from the battery 11. But at the same time, the field winding 26 of the dynamo 10 is supplied with current so that the dynamo is excited without risk in operation, even after a prolonged period of stoppage. The small value of the resistance 27 permits of re-excitation in this way. If it is desired to increase the dynamo-excitation, it will suffice to engage a gear and this will apply the full voltage of the battery to the field winding 26 when the contact 30 is operated, while in the first case, the voltage applied to the field winding is reduced due to the operation of the starter motor 13.

It is to be noted that the safety switch 34 makes it possible to avoid the operation of the starter 13 when a gear has been inadvertently engaged.

However when the engine has broken down and it is absolutely necessary to move the vehicle forwards or backwards for a short distance, for example if the vehicle is in difficulties at a level crossing, the first gear or reverse is engaged which opens the switch 34 and the moving contact 28 is placed by the user on the terminal 22 so as to short-circuit the open safety switch 34. It will be noted that, in this case, no current is supplied to the field winding. As soon as the switch 30 of the starter has been closed and held closed, the coil 19 is excited and the starter motor 13 is supplied with current from the battery 11 and this drives the vehicle forwards or backwards, as the case may be. All danger is then removed.

In the modification of FIG. 2, the arrangement is similar to that shown on FIG. 1 and it is recognized at 34 the safety switch operably connected to the gear box but the driver actuated switch 23 is replaced by a switch 35 which is sensitive to an actuating condition of the lever 36 for changing gears. The arrangement of FIG. 2 is more particularly useful when an automatic clutch of the vehicle (shown for instance at 37 in FIG. 3) is provided with parking means retaining the vehicle stationary by the compression of the engine. When the vehicle is thus retained on a slope, the gears of the gear-box are under load and oppose the restoring of the gear-box towards the neutral position. The switch 35 is intended to permit of such restoring.

When the gear-box is in neutral, the safety switch 34 is closed. When actuating the control 30, the starter motor 13 is made running.

When the gear-box is in gear, the switch 34 is open. When the user actuates the control 30 without actuating the lever 36, the starter motor 13 is not actuated. The user is warned that the gear-box is in gear.

The user then restores the lever 36 in neutral which operation is easy if the vehicle is on the flat. And the user actuates again the control 30 whereby starting the motor 13 and the engine of the vehicle.

When the vehicle has been stopped on a slope the user actuates both the control 30 and the lever 36 restoring this latter towards the neutral position. The switch 35 closes and enables the engine rotating whereby releasing the load on the gears of the gear-box and accommodating such a return of this latter to neutral.

Reference will now be made to FIG. 3 wherein the device of FIG. 2 is applied to a vehicle having a clutch of the centrifugal type 37 with a de-clutching electro-magnet 38. The switch 36 is a part of a double-switch relay 39 the other switch 40 of which is comprised in a circuit feeding the electro-magnet 38 from the battery 11. The coil 41 of the relay 39 is fed from the battery 11 by a circuit comprising the switch 42 sensitive to the lever 36 condition.

FIG. 4 shows another application of the circuit of FIG. 2 to an electromagnetic clutch 43, similar reference numbers being chosen in FIG. 4 and in FIG. 3 for designating similar elements.

In the modification shown on FIG. 5, it is seen at 44 the ignition circuit connecting the battery 11 to the ignition coil 45. The coil 19 is fed by the battery 11 and is connected to two parallel circuits 46 and 47. The circuit 46 comprises the safety switch 34 and the main control 30 for the starter-motor 13. The control 30 is associated to the ignition control 48.

Actuation of both controls 30 and 48 is effected by the same member 49 which at first closes the switch 48 and thereafter closes the switch 30. The circuit 47 comprises a second control switch 50 for the starter motor 13. The switch 50 is associated with a switch 51 comprised in the ignition circuit 44 so that when the switch 50 is closed the switch 51 is open and vice-versa. The switches 51 and 48 are comprised in the ignition circuit 44.

When the gear box is in gear and the vehicle stopped on a slope by a parking device from the engine compression, the user can restore the gear-box to neutral if he actuates simultaneously the switch 50. This operation is without danger since the ignition circuit 44 is cut-off at 51. When the gear-box is thus restored to neutral, the user actuates normally the member 49.

What we claim is:

1. A control circuit for the starter motor of an automobile vehicle having a gear-box and a lever for changing gears comprising a safety switch operably connected to said gear-box for opening said circuit when said gear-box is in a position other than the neutral and a switch sensitive to an actuating condition of said lever for short-circuiting said safety switch.

2. A control circuit for the starter motor of an automobile vehicle having a gear-box, a lever for changing gears, an automatic clutch, and means for declutching said clutch when said lever is actuated, comprising a safety switch operably connected to said gear-box for opening said circuit when said gear-box is in a position other than the neutral and a switch actuatable by said de-clutching means for short-circuiting said safety switch when said lever is actuated.

3. A control circuit as defined in claim 2 wherein said clutch is provided with parking means retaining the vehicle stationary by the engine compression.

4. A control circuit as defined in claim 2 wherein said clutch is a centrifugal clutch.

5. A control circuit as defined in claim 2 wherein said clutch is an electromagnetic clutch.

References Cited in the file of this patent
UNITED STATES PATENTS

| | | |
|---|---|---|
| 1,828,514 | Spivey | Oct. 20, 1931 |
| 1,941,433 | Doman | Dec. 26, 1933 |
| 2,131,026 | Doman | Sept. 27, 1938 |
| 2,572,397 | Short et al. | Oct. 23, 1951 |
| 2,609,514 | Schneider et al. | Sept. 2, 1952 |
| 2,659,018 | Harrison | Nov. 10, 1953 |
| 2,685,650 | Collins et al. | Aug. 3, 1954 |
| 2,695,366 | Coffey | Nov. 23, 1954 |